(12) United States Patent
Sassano

(10) Patent No.: US 6,564,222 B1
(45) Date of Patent: May 13, 2003

(54) INFORMATION PROCESSING SYSTEM AND METHOD THAT SELECTS AN APPROPRIATE INFORMATION RETRIEVAL SYSTEM BASED ON A CONTEXT IN WHICH A USER MAKES A REQUEST FOR RETRIEVAL

(75) Inventor: Manabu Sassano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/520,755

(22) Filed: Mar. 7, 2000

(30) Foreign Application Priority Data

Mar. 26, 1999 (JP) .......................................... 11-082819

(51) Int. Cl.[7] ............................................. G06F 17/30
(52) U.S. Cl. ......................................... 707/102; 717/11
(58) Field of Search ............................ 707/102; 717/11

(56) References Cited

U.S. PATENT DOCUMENTS 6,148,296 A * 11/2000 Tabbara ........................ 707/3
6,182,091 B1 * 1/2001 Pitkow et al. ............... 707/501
6,226,792 B1 * 5/2001 Goiffon et al. ................ 717/11
6,327,593 B1 * 12/2001 Goiffon ....................... 707/102
6,502,102 B1 * 12/2002 Haswell et al. ............. 707/102

* cited by examiner

Primary Examiner—Charles Rones
(74) Attorney, Agent, or Firm—Staas & Halsey LLP

(57) ABSTRACT

An information retrieval processing system includes a search question input unit to receive a search question of a user. A context acquisition unit then acquires a context from a context action correspondence table that corresponds to the received search question. An action which corresponds to the acquired context is then used to select an information retrieval system from a plurality of information retrieval systems. A history recording unit records a history of the questions received by the search question input interface unit such that the recorded history is used to select the information retrieval system. Accordingly, the retrieval system automatically reads the context into which the user will attempt to input the information and automatically select an information retrieval system from among the plurality of information retrieval systems.

20 Claims, 16 Drawing Sheets

CONTEXT ACTION CORRESPONDENCE TABLE

| Context | Action |
|---|---|
| Application A | Information retrieval system a |
| Application B | Information retrieval system b |
| Application C | Activate the information retrieval system in application C |
| X mode of application C | Information retrieval system c |
| Application D | Activate information retrieval system s and information retrieval system t |
| ⋮ | ⋮ |
| Context other than above | Information retrieval system x |

FIG. 3

CONTEXT ACTION CORRESPONDENCE TABLE

| Context | Action |
|---|---|
| Word processor (text input screen) | Activate retrieval system within document of word processor |
| Word processor (help screen) | Activate help retrieval system within word processor |
| On icon of Web browser | Access Internet search engine |
| On list of bookmarks of Web browser | Activate retrieval system within bookmarks of a Web browser |
| On screen viewing normal page of Web browser | Access retrieval system within page of Web browser or Internet search engine |
| On icon of mail read/write software | Search within e-mail address book or access retrieval system of saved mail |
| ...... | ...... |
| Context other than above | Information retrieval system x |

FIG. 4

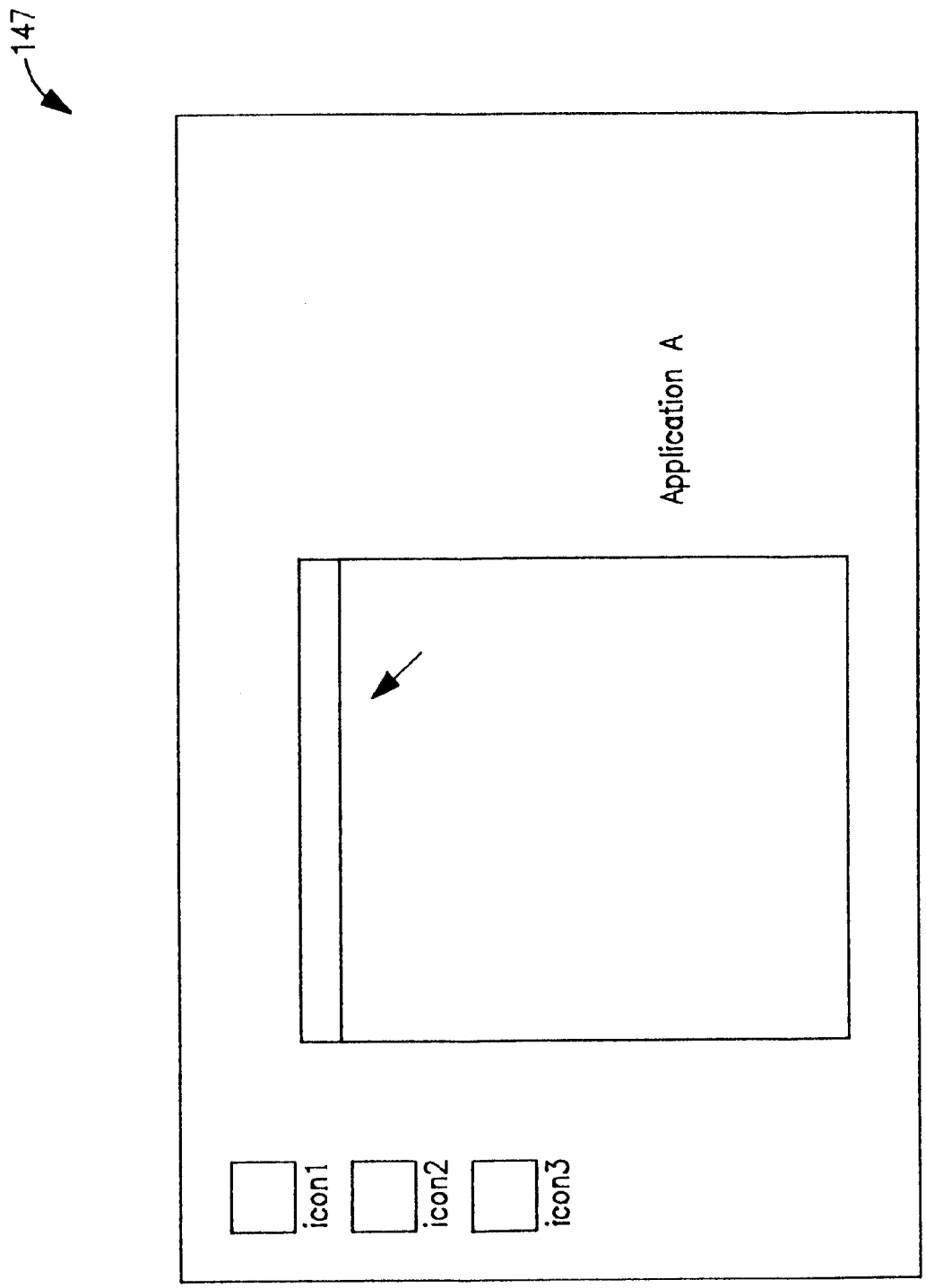

CONTEXT ACTION CORRESPONDENCE TABLE

| Context | Action | Search question change |
|---|---|---|
| Application A | Information retrieval system a | Unnecessary |
| Application B | Information retrieval system b | Unnecessary |
| Application C | Activate information retrieval system in application C | Unnecessary |
| X mode of application C | Information retrieval system c | Japanese–English translation |
| Application D | Activate information retrieval system s and information retrieval system t | Unnecessary |
| •••• | •••• | |
| Context other than that above | Information retrieval system x | Unnecessary |

The necessary change of the search question is carried out according to content of context action correspondence table 146.

Information retrieval system selection unit 144 carries out prescribed operation (activating any of the information retrieval systems, etc.) according to result inquired into.

ST20

The search result is returned to user through output unit 145.

FIG. 13

User selects and uses
information retrieval system

INFORMATION PROCESSING SYSTEM AND METHOD THAT SELECTS AN APPROPRIATE INFORMATION RETRIEVAL SYSTEM BASED ON A CONTEXT IN WHICH A USER MAKES A REQUEST FOR RETRIEVAL

CROSS-REFERENCE TO RELATED APPLICATIONS

This application is based upon and claims priority of Japanese Patent Application No. 11-82819 filed Mar. 26, 1999, the contents being incorporated herein by reference.

BACKGROUND OF THE INVENTION

The present invention relates to an information retrieval processing system that retrieves information such as a text. More particularly, the present invention relates to an information retrieval processing system which retrieves an input, such as a search question, regardless of the type of character string, from a search medium such as the internet.

Conventionally, when a user intends to conduct a search by way of multiple information retrieval systems, it is necessary for a search question input interface to be selected from among the multiple information retrieval systems. The input is then conducted by way of the selected input interface.

FIG. 17 is a schematic view of a conventional search question input system 100. As illustrated, the user 102 must select and use one of a plurality of information retrieval systems, namely: information retrieval system a, designated by reference number 104; information retrieval system b, designated by reference number 106; information retrieval system c, designated by reference number 108; information retrieval system d, designated by reference number 110; or information retrieval system e, designated by reference number 112. The selected information retrieval system then communicates with an output unit 114.

FIG. 18 is a schematic view of an alternative search question input system 116. By way of alternative system 116, user 102 inputs a search question into a certain one input interface without selecting any search question input interface. The search question is then passed to all of the information retrieval systems.

Among the conventional systems mentioned above, the system configuration illustrated in FIG. 17 requires time for the user to select the appropriate information retrieval system. Likewise, with the alternative system configuration illustrated in FIG. 18, the information retrieval is executed by information retrieval systems in which the user did not desire. Thus, there are times when an excess of information is presented to the user. Thus, the operating speed of the system used by the user becomes slower due to the fact that it is necessary to wait until the entire search of each information retrieval system is completed. Furthermore, the user retrieves a large quantity of search results which provides for inefficiency.

BRIEF SUMMARY OF THE INVENTION

It is therefore an object of the present invention to solve the above-mentioned problems in the art by providing an information retrieval processing system that reduces the user time required in information retrieval.

It is a further object of the invention to provide a mechanism that reads a context in which a user operates an information retrieval system, such as a context in which a search question will be input, and selects an appropriate information retrieval system by way of that mechanism.

It is an even further object of the present invention to provide an information retrieval processing system by using a context in which a user will input a search question, and in which the time required for using the information retrieval processing system is reduced.

Objects of the present invention are achieved by an information retrieval processing system, including a search question input unit to receive a search question of a user; a context acquisition unit to acquire a context upon receiving the search question of the user; and a selection unit to select an information retrieval unit from among a plurality of information retrieval units based on the context acquired by the context acquisition unit, and to access the selected information retrieval unit.

Further objects of the present invention are achieved by an information retrieval processing system, including a search question input interface unit to receive a search question from a user; a context acquisition unit to acquire a context upon receiving the search question from the user; and a search question change unit to change the received search question into a second search question.

Even further objects of the present invention are achieved by an information retrieval processing method, including inputting a search question from a user; acquiring a context corresponding to the search question upon input by the user; selecting an information retrieval system among multiple information retrieval systems based on the context acquired in the acquiring step; and accessing the selected information retrieval system.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 3 is a context action correspondence table according to the first embodiment of the present invention.

FIG. 4 is a context action correspondence table according to the first embodiment of the present invention.

FIG. 5 is a schematic view of a first screen image used in accordance with an embodiment of the present invention.

FIG. 10 is a context action correspondence table in accordance with the second embodiment of the present invention.

FIG. 12 is a block diagram of an operational step in accordance with the operation flow of the second preferred embodiment.

FIG. 13 is a block diagram of an operational step in accordance with the operation flow of the second embodiment.

DETAILED DESCRIPTION OF THE PREFERRED EMBODIMENTS

Figure 1:
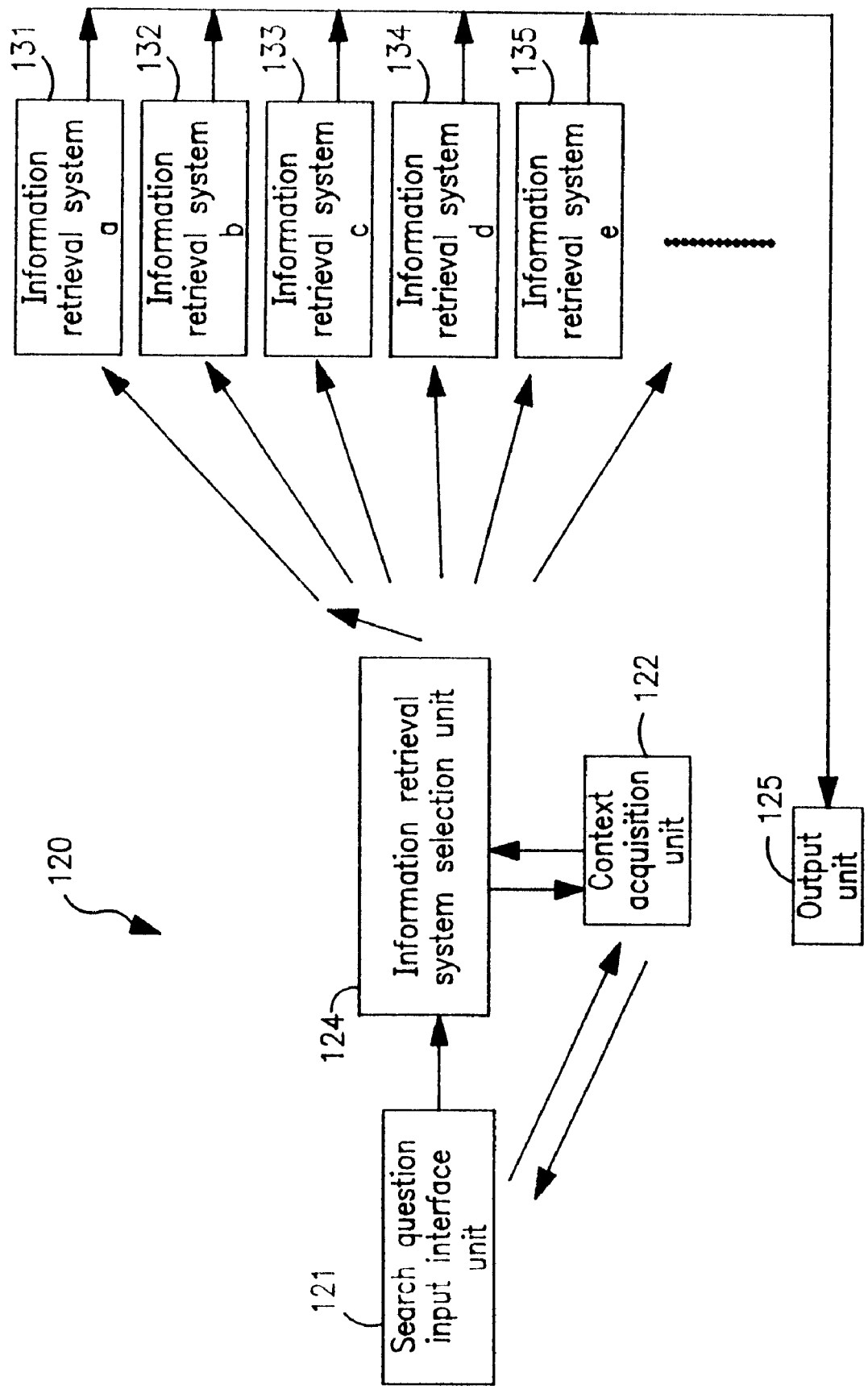
FIG. 1 is a block diagram of a general information retrieval processing system to an embodiment of the present invention.

Reference will now be made in detail to the preferred embodiments of the present invention, examples of which are illustrated in the accompanying drawings, wherein like reference numerals refer to like elements throughout.

Turning now to the figures, and in particular FIG. 1, an information retrieval processing system 120 is shown according to an embodiment of the present invention. The information retrieval processing system 120 has a search question input interface unit 121 that accepts a search question from a user. A context acquisition unit 122 then acquires the context in which the user is about to input the search question, and an information retrieval system selection unit 124 selects the appropriate information retrieval system 131~135 based on the context acquired by the context acquisition unit 122.

As illustrated, the information retrieval system selection unit 124 selects one or multiple information retrieval systems from among multiple information retrieval systems 131~135 and passes the search question from the user to the selected information retrieval system. The search result is then passed to the output unit 125 and, ultimately, the search result is presented to the user.

Figure 2:
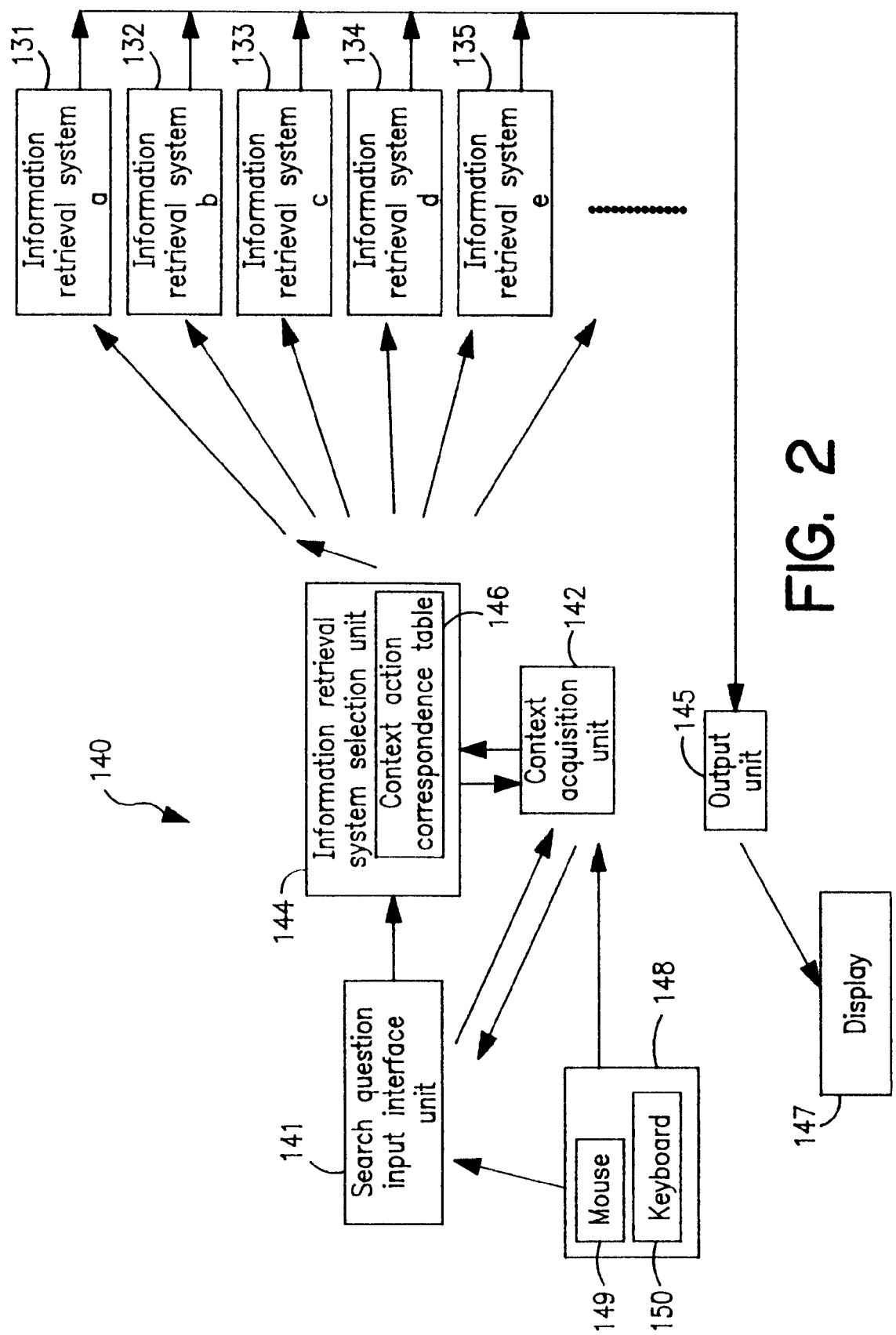
FIG. 2 is a block diagram of an information retrieval processing system according to a first preferred embodiment of the present invention.

FIG. 2 is a block diagram of an information retrieval processing system 140 according to a first embodiment of the present invention. The information retrieval processing system 140 has a search question input interface unit 141 that receives the search question from the user. A context acquisition unit 142 then acquires the context in which the user is about to input the search question, and an information retrieval system selection unit 144 then selects the appropriate information retrieval system 131~135 based on the context acquired by the context acquisition unit 142. The system 140 includes output unit 145, a context action correspondence table 146, and a display 147 (that displays the output of the output unit 145). The information retrieval processing system 140 further includes an input unit 148, which includes devices such as a mouse 149 and a keyboard 150.

The context action correspondence table 146 is a table that stores information related to the context obtained from the context acquisition unit 142, as well as the corresponding actions for selecting the information retrieval system.

FIGS. 3 and 4 illustrate examples of data structures for context action correspondence table 146. The context action correspondence table 146 records pairs of contexts and corresponding actions. An example of context is information such as a cursor of the mouse that shows a point that is input, which application the screen cursor is indicating, and, in more detail, the operation mode of the application. The context provides a variety of information, not just information such as what the application is. The context may even provide information indicating the mode of the application and the domain indicated by the application.

Furthermore, as actions that correspond to a context, there are, for example, the activation and the accessing of any information retrieval system among multiple information retrieval systems. In addition, in some applications the information retrieval system within the application can also be accessed. A certain action is decided as the action of the time when none of the registered contexts are applicable. A certain action means, for example, activating and accessing a certain specific information retrieval system.

Figure 6:
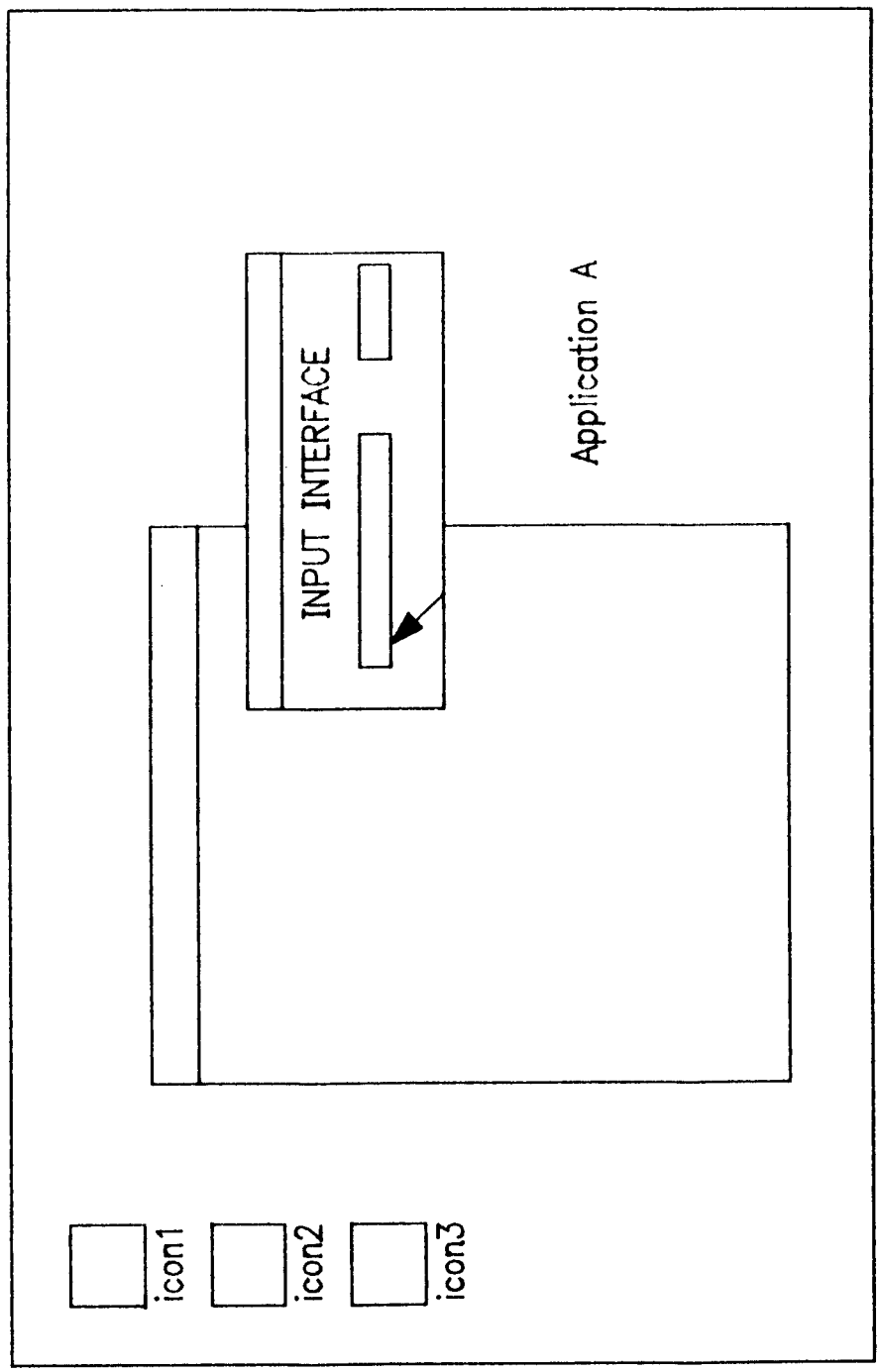
FIG. 6 is a schematic view of a second screen image used in accordance with an embodiment of the present invention.
Figure 7:
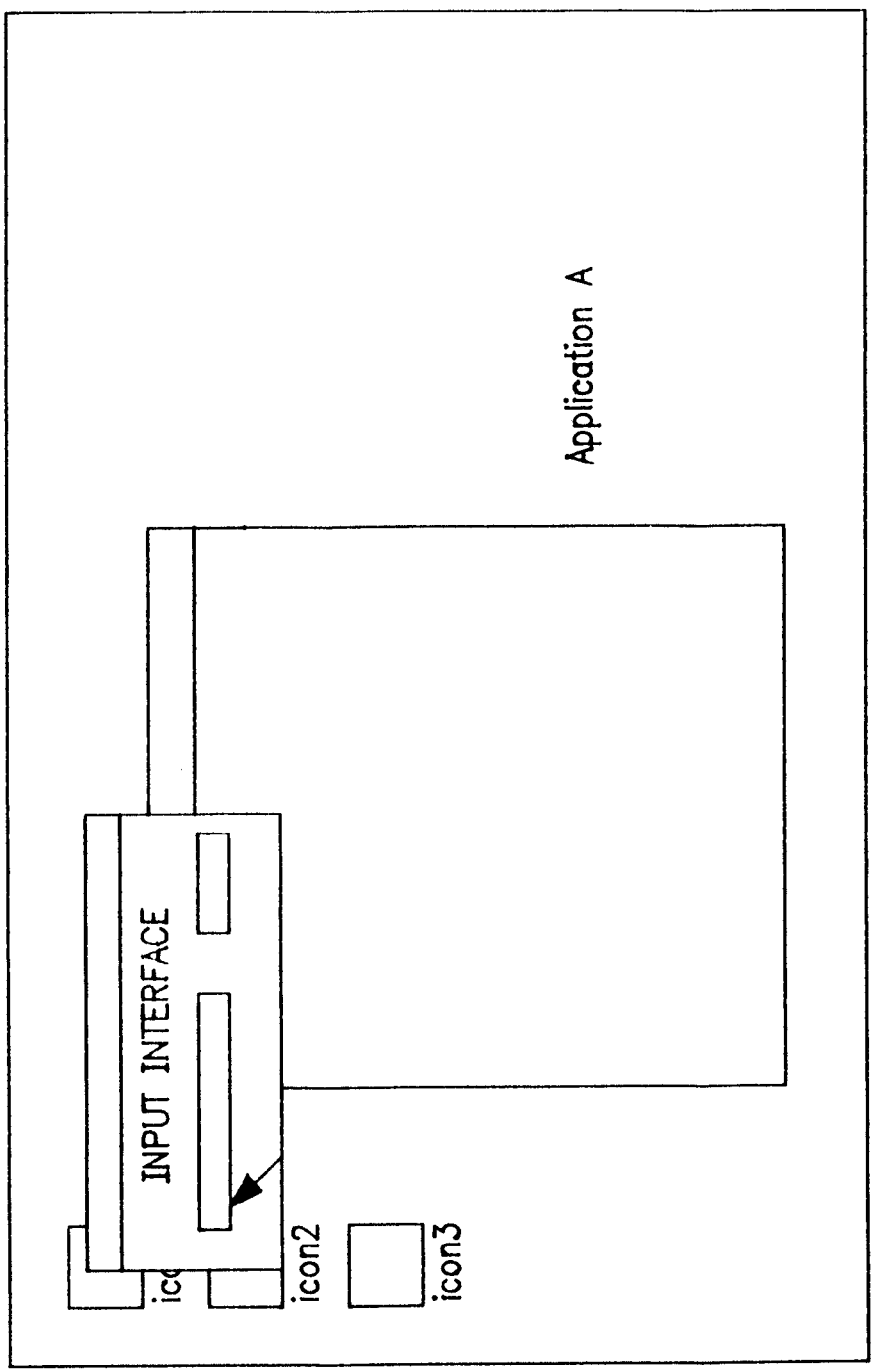
FIG. 7 is a schematic view of a third screen image used in accordance with an embodiment of the present invention.

FIGS. 5~7 illustrate examples of screen images. FIG. 5 illustrates an example of a search question input interface unit 141 that is activated (e.g. by a set key operation or mouse operation, etc.) while an application A is active. FIG. 6 illustrates an example in which there is a mouse cursor in a window and a screen is displayed. On the other hand, when the search question input interface unit 141 is activated when the mouse cursor is on an icon (such as icon 1), a screen is displayed, as in FIG. 7. However, the interfaces themselves for inputting a search question are both the same.

Figure 8:
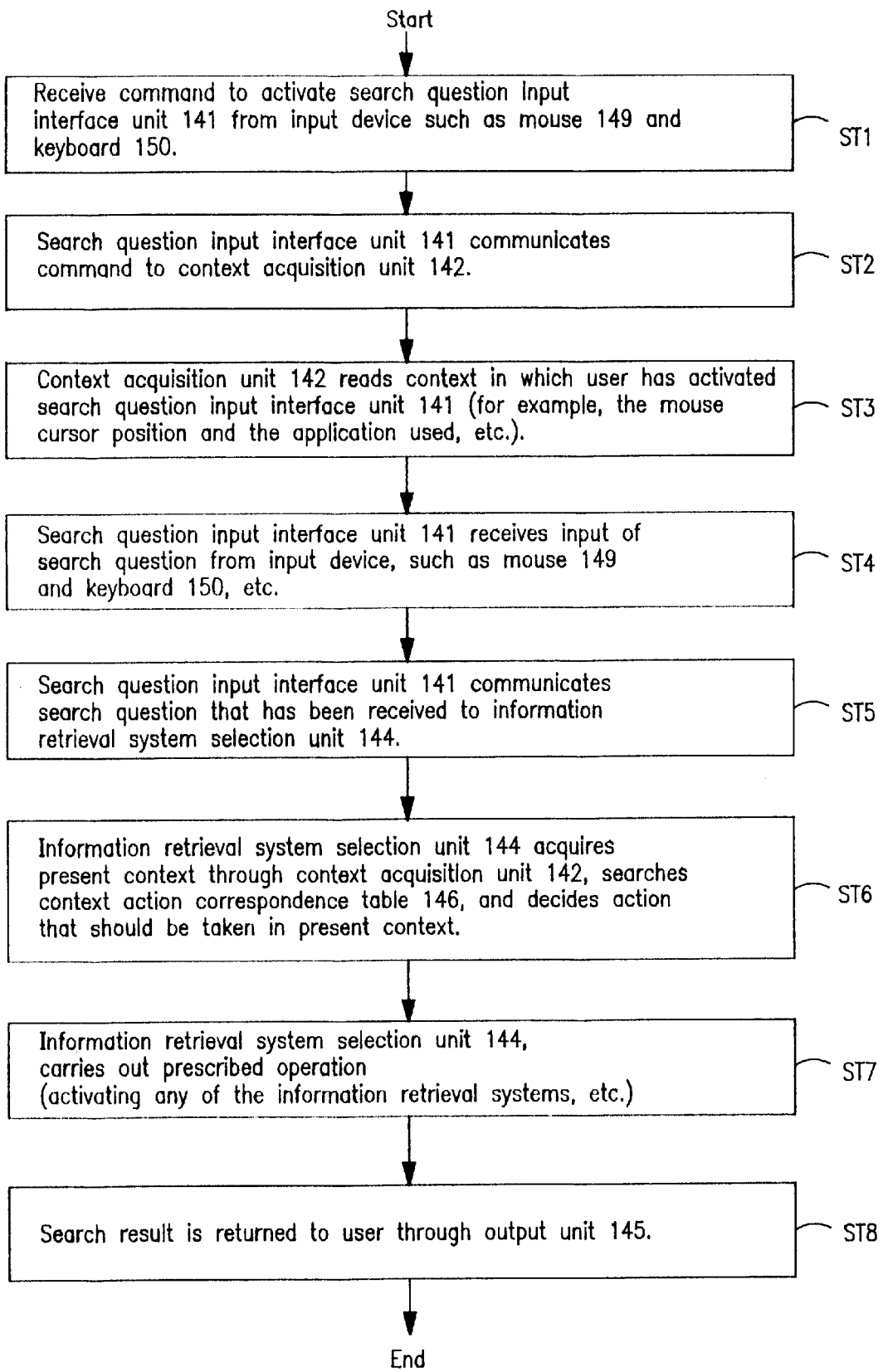
FIG. 8 is a flow chart illustrating operation flow of an information retrieval process according to the first embodiment of the present invention.

FIG. 8 is a flow chart of the operation of an information retrieval system according to an embodiment of the present invention. As illustrated, flow begins when search question input interface unit 141 monitors the events of the keyboard 150 and the mouse 149, i.e. the status of whether or not a key has been pressed. The status information is normally notified by the operating system (OS). When an event occurs that should activate the search question input interface part 1, operation starts in accordance with the flow chart of FIG. 8.

The context acquisition unit 142 learns the position of the mouse cursor and the applications that have been activated at the present time by consulting the OS. The information retrieval system selection unit 144 carries out the operation that corresponds to the context, for example, as follows: if the applications that should be activated have made public the application interfaces (API) that access the respective information retrieval systems, an information retrieval system is accessed using that API. If it has not been made public, the input of the keyboard 150 and the movement of the mouse 4 is simulated and input, and the application that should be activated is made to operate.

By way of the above operation, different information retrieval systems can be used with less time through the same operation that activates the search question input interface part 141. For example, when a word processor is being used, text retrieval within the word processor is activated, and when an Internet Web page browser is being used, an Internet search engine is activated.

In the above-mentioned operation, when, as a result of searching the context action correspondence table 146, vagueness has occurred in the operation, it is acceptable to have that fact presented to the user, and have the user himself select the information retrieval system. Furthermore, when multiple information retrieval systems have been output as a result of having searched the context action correspondence table 146, it is acceptable to assign precedence and present starting from those that have a high precedence, and even using only the one in the first place are acceptable.

The operation flow of FIG. 8 is now explained. In step ST1, A command that activates the search question input interface part 141 is first received from input devices such as the mouse 149 and keyboard 150. In step ST2, the search question input interface unit 141 communicates that command to the context acquisition unit 142. In step ST3, the context acquisition unit 142, upon receiving the command, reads the context in which the user activated the search question input interface part 141 (for example, the mouse cursor position, and the application being used, etc.).

In step ST4, the search question input interface unit 141 accepts the input of the search question from an input device such as mouse 149 and keyboard 150. Turning to step ST5, the search question input interface unit 141 communicates the received search question to the information retrieval system selection unit 144. The information retrieval system selection unit 144 next obtains the present context through the context acquisition unit 142, searches the context action correspondence table 146, and decides the operation that should be taken in the present context in step ST6.

In step ST7, the information retrieval system selection unit 144, in response to the result inquired into, carries out the prescribed operation, such as activating any of the information retrieval systems, etc. In step ST8, the search result is then returned to the user through the output unit 145.

Figure 9:
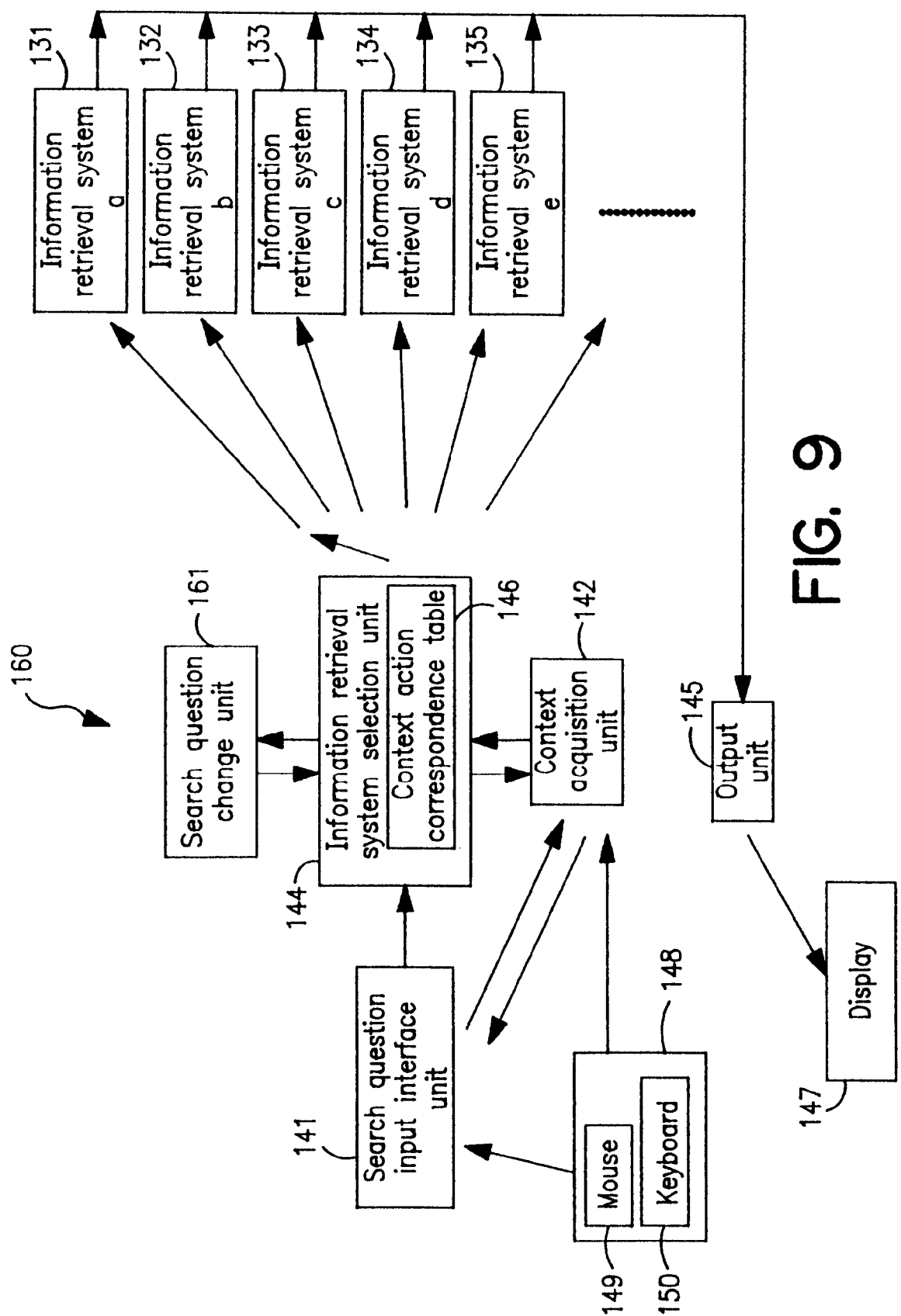
FIG. 9 is a block diagram of an information retrieval processing system according to a second embodiment of the present invention.

FIG. 9 is a block diagram of an information retrieval processing system 160 according to a second embodiment of the present invention. As in the first embodiment of the present invention, the system 160 has a search question input interface unit 141 that receives a search question of the user. A context acquisition unit 142 acquires a context in which the user is about to input the search question, and an information retrieval system selection unit 144 then selects the appropriate information retrieval system 131~135 based on the context obtained by the context acquisition unit 142. Furthermore, output unit 145, context acquisition correspondence table 146, display 147 that actually displays the output of the output unit 145, input part 148, and mouse 149 and keyboard 150 as input devices are similar to the first embodiment.

However, information retrieval processing system 160 has a search question change unit 161. The search question change unit 161 carries out a change of the search question in response to the context read by the context acquisition unit 142.

FIG. 10 illustrates an example of the contents of context action correspondence table 146. In FIG. 10, the context action correspondence table 146 controls matters such as the existence of a search question change, and, if necessary, what the kind of change that is necessary. In the search question changes there is, for example, Japanese—English translations. This is one that changes a Japanese search question into an English search question. Other translations can also be considered, such as the conversion of currency units, for example: changes from yen to dollars.

Figure 11:
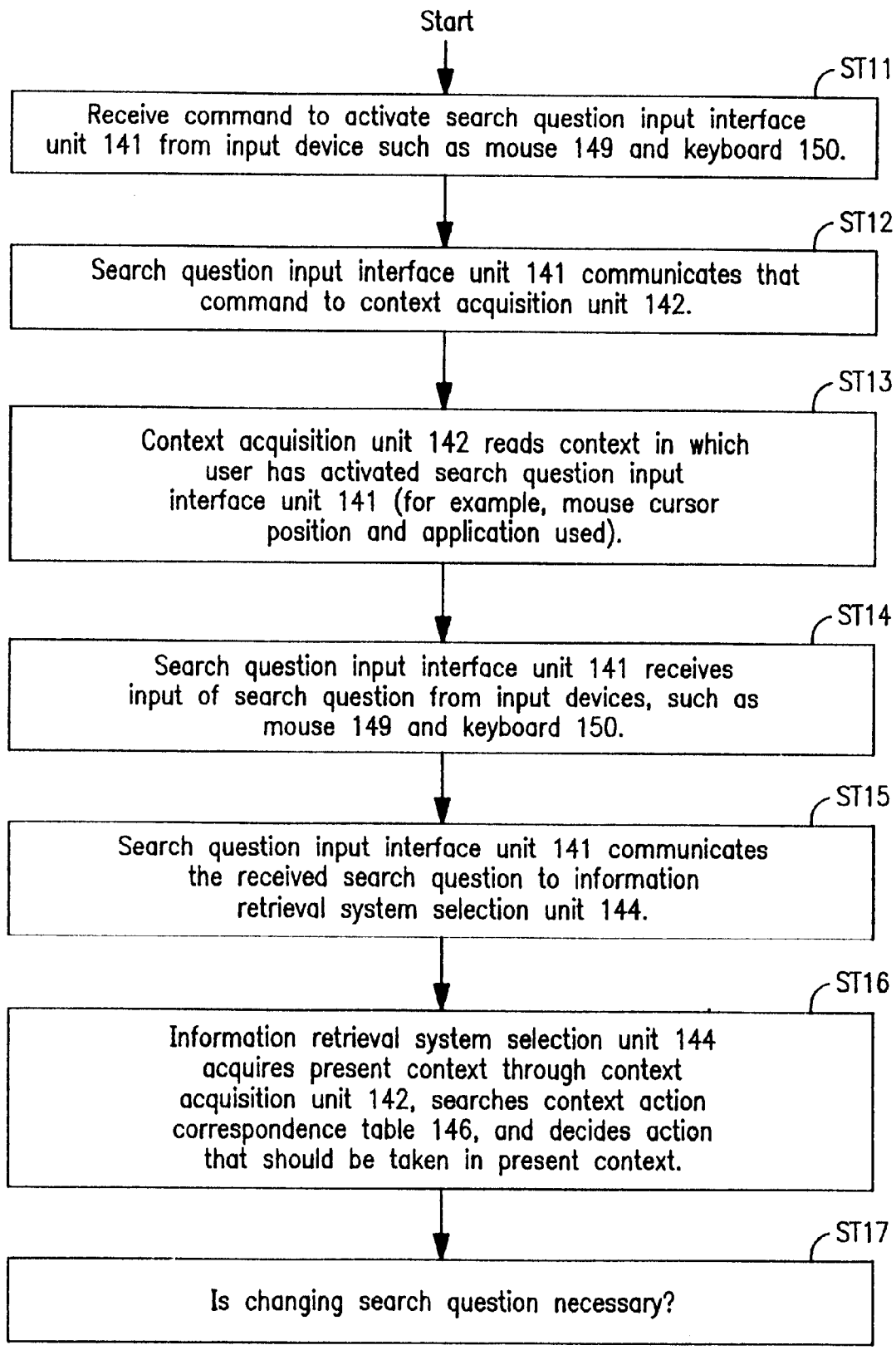
FIG. 11 is a flow chart illustrating operation flow of an information retrieval system according to the second embodiment of the present invention.

FIGS. 11 to 13 illustrate an example of the flow of the operation of the second embodiment of the present invention. According to this operation, in addition to the effect at the time of the first embodiment mentioned above, the following kind of effect can be obtained. For example, a user wishes to view text written in the English language. If Japanese—English translation is written as a search question change in the context action correspondence table 146, even if a Japanese word is entered it is automatically translated into English, and passing a search question to the appropriate information retrieval system becomes possible. Passing of the search question to the appropriate information retrieval system is acceptable even if the user is not concerned about matters such as which information retrieval system to use and whether or not translation is necessary. Thus, the trouble of selecting an information retrieval system becomes unnecessary, and furthermore, it is also not necessary to be concerned about whether or not a search question must be translated in advance.

The operation flow of FIGS. 11~FIG. 13 is now explained. In step ST11, a command that activates the search question input interface unit 141 is first received from an input device such as mouse 149 or keyboard 150. In step ST12, the search question input interface unit 141 sends the inputted command to the context acquisition unit 2.

In step ST13, the context acquisition unit 142, upon receiving the command, reads the context in which the user activated the search question input interface unit 141. For example, the context may be the mouse cursor position and the application being used. In step ST14, the search question input interface unit 141 receives the input of the search question from an input device, such as mouse 149 and keyboard 150.

Turning to step ST15, the search question input interface unit 141 the sends the received search question to the information retrieval system selection unit 144. The information retrieval system selection unit 144 then acquires the present context through the context acquisition unit 142, searches the context action correspondence table 146, and then decides the operation that should be taken in the present context in step ST16. Next, in step ST17, a decision is made whether or not a change of the search question is necessary.

In FIG. 12, step ST18 is shown. When it has been decided that a change of the search question is necessary, the necessary change of the search question is carried out according to the contents of the context action correspondence table 146 in step ST18.

Likewise, in FIG. 13, step ST19, the information retrieval system selection unit 144 carries out the prescribed operation, such as activating an information retrieval system, etc., according to the investigated result. The search result is returned to the user through the output unit 145 in step ST20.

Figure 14:
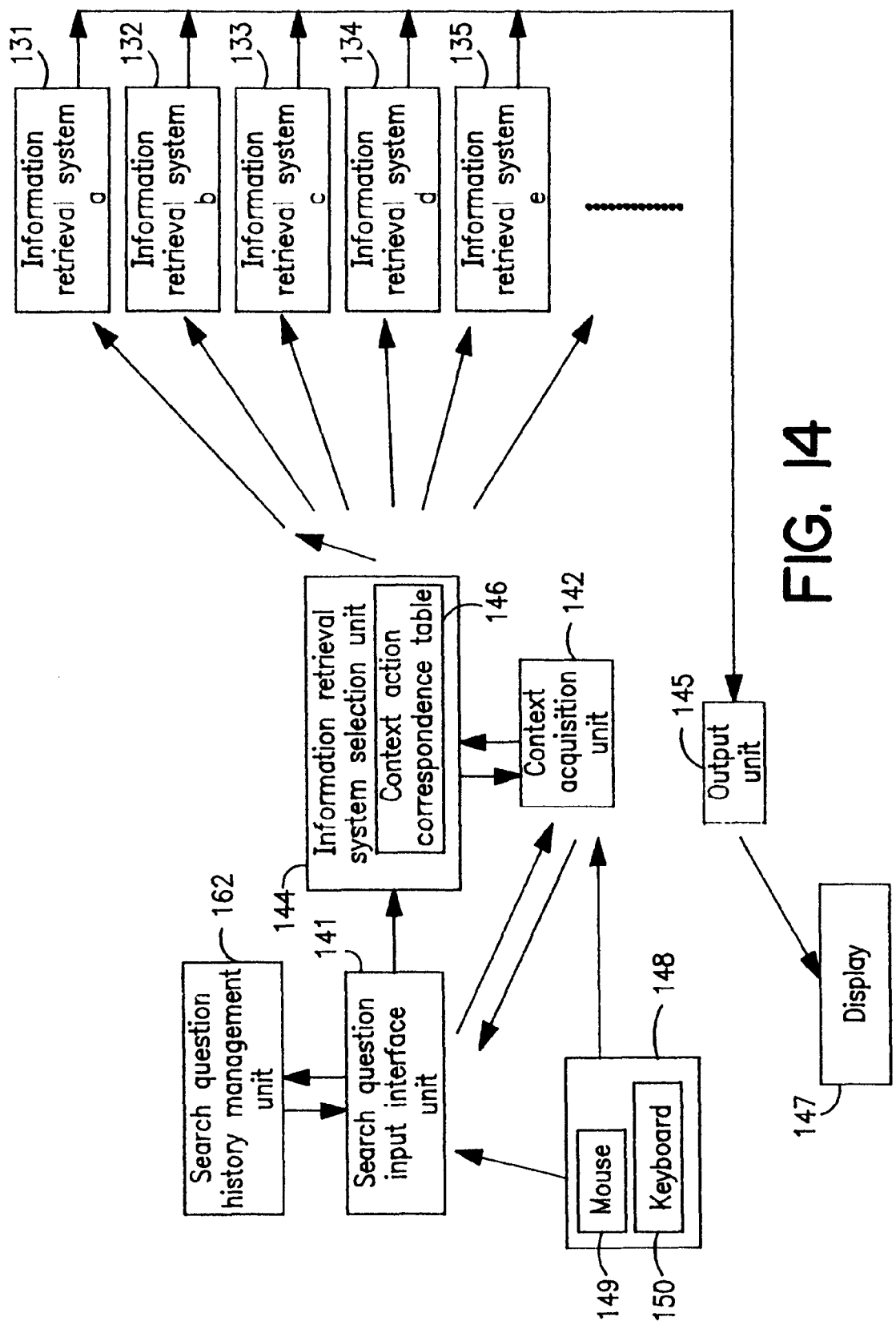
FIG. 14 is a block diagram of an information retrieval processing system according to a third embodiment of the present invention.

FIG. 14 is a configuration diagram of the information retrieval processing system of a third embodiment of the present invention. As in the first embodiment and the second embodiment of the present invention, the system has a search question input interface unit 141 that receives the search question of the user, a context acquisition unit 142 that acquires the context in which a user is about to input a search question, an information retrieval system selection unit 144 that selects the appropriate information retrieval system 131~135 based on the context acquired by the context acquisition unit 142. An output unit 145, a context action correspondence table 146, a display 147 that actually displays the output of the output unit 145, an input unit 8, and a mouse 149 and a keyboard 150 as input devices are also included.

Furthermore, the third embodiment has a search question history management unit 162. The search question history management unit 162 has a function that records the search questions which a user has input with respect to the search question input interface unit 141, and that can access past search questions when necessary. For example, if implemented using files and memory, in addition to the effect at the time of the first embodiment, the following kind of effect can be obtained. Search questions are input using one search question input interface unit 141, when using any information retrieval system. And, that history is recorded in the search question history management unit 142. For that reason, even when a search question that has been input with respect to a certain information retrieval system is input with respect to another information retrieval system, if the contents of the past history is searched and used, there is no need to re-input. Accordingly, the time of inputting can be reduced.

As yet another embodiment of the present invention, a configuration that combines the second embodiment and the third embodiment is also possible. That is, the configuration that includes both the search question change unit 161 and the search question history management unit 162. According to this embodiment, obtaining a system provided with the advantages of both the second embodiment and the third embodiment combined becomes possible.

Figure 15:
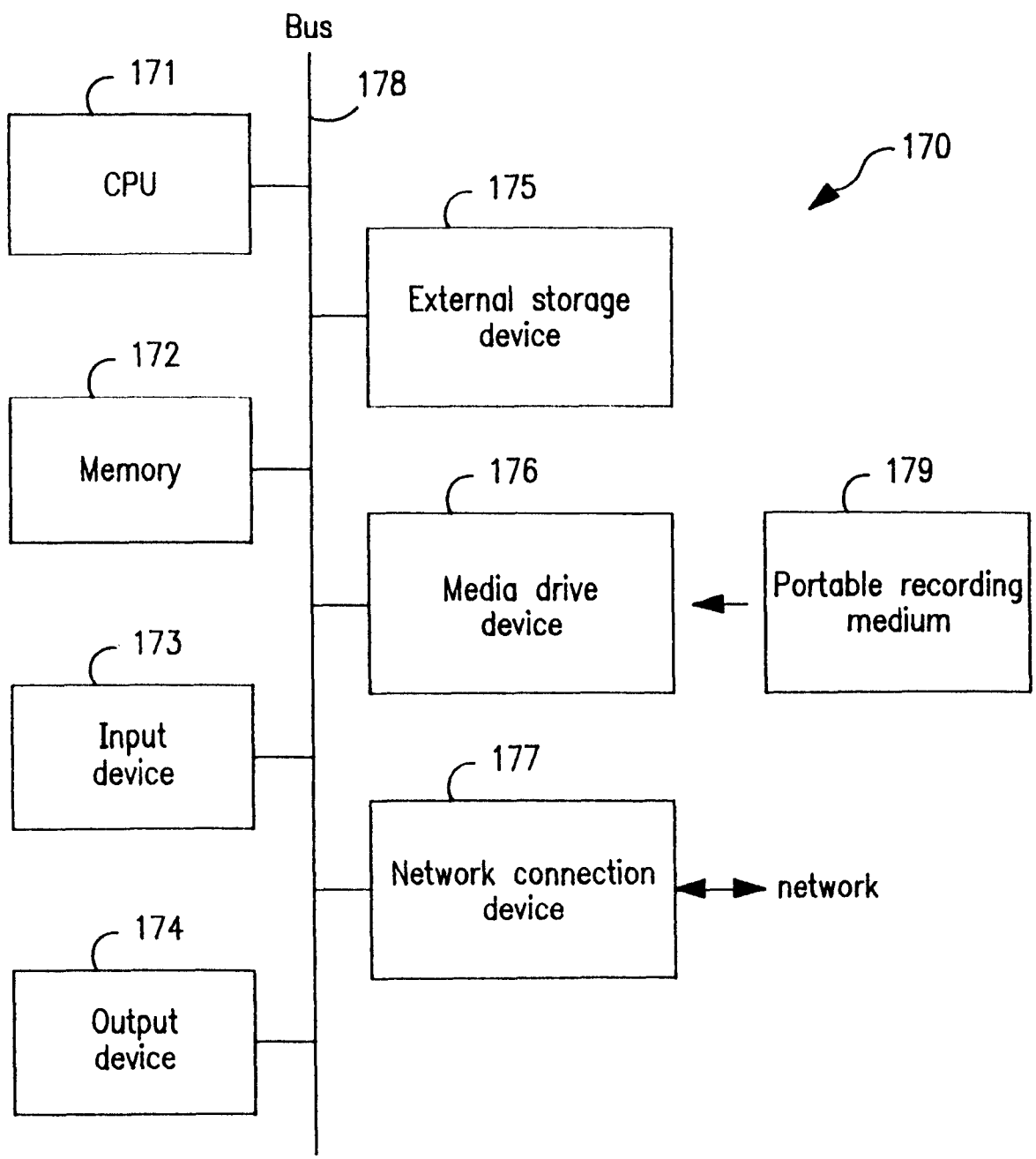
FIG. 15 is a block diagram of a hardware configuration for an information processing device to implement an embodiment of the present invention.

FIG. 15 illustrates the information retrieval processing system of the present implementation mode, which is configured using, for example, an information processing unit 170. The information processing unit is illustrated in the form of a computer. The information processing unit 170 is provided with a CPU (central processing unit) 171, memory 172, an input device 173, an output device 174, an external storage device 175, a media drive device 176, and a network connection device 177. The above devices are interconnected to one another by a bus 178.

Programs and data used in processing by the information processing unit 170 are stored in the memory 172. For memory 172, a ROM (read only memory) and a RAM (random access memory), etc., are used. The CPU 171 carries out the necessary processing by making use of the memory 172 and executing the programs.

The input device 173 is, for example, a keyboard, a pointing device (mouse, etc.) and a touch panel, and is used for inputting commands and information from a user. The output device 174 is, for example, a display and a printer, that is used for the output of inquiries and processing results, etc., to the user.

The external storage device 175 is, for example, a magnetic disk, an optical disk, or a magneto-optical disk, etc. Programs and data are stored in this external storage device 175, and, when necessary, they can also be loaded into the memory 172 and used.

The media drive device 176 drives a portable recording medium 179 and accesses its stored contents. As a portable recording medium any computer readable recording medium such as a memory card, a floppy disk, a CD-ROM (compact disk read only memory), an optical disk, or a magneto-optical disk can be used. Programs and data are stored in this portable recording medium 179 and, when necessary, they can also be loaded into the memory 172 to be used.

The network connection device 177 communicates with other devices via any network (circuit) such as a LAN (local area network) and carries out the data exchange that goes with the communication. Accordingly, programs and data are received from external devices, as necessary, and they can also be loaded into the memory 172 and used.

Figure 16:
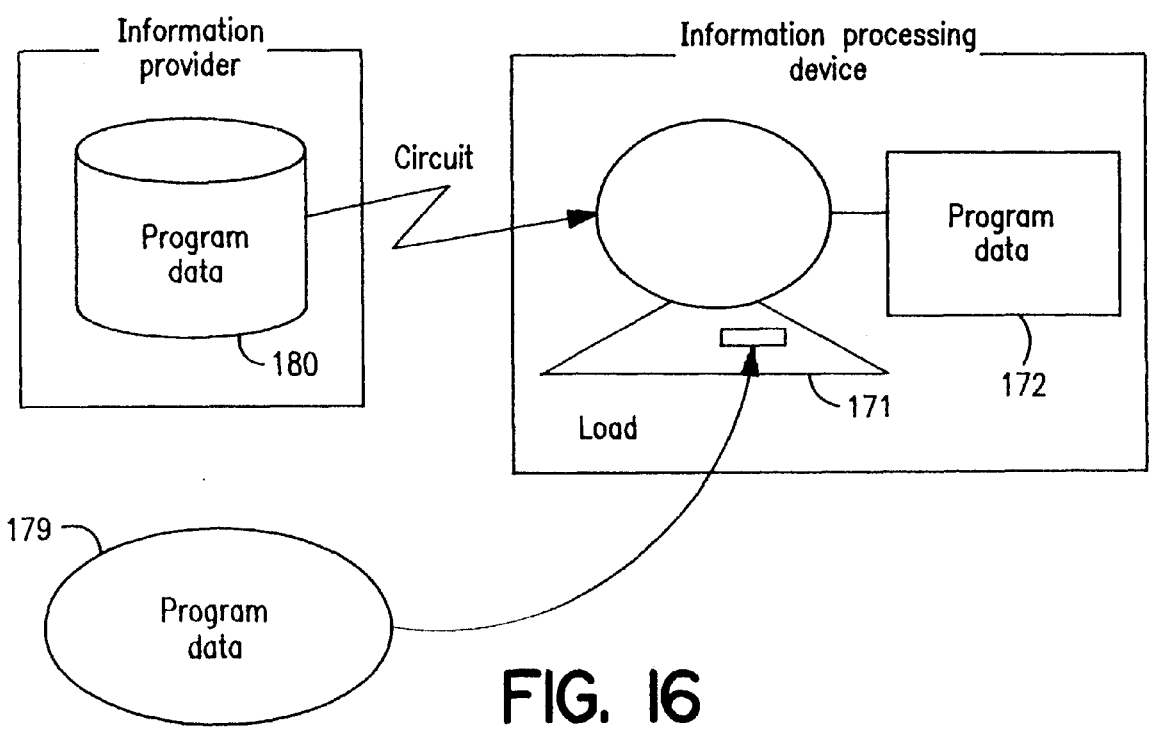
FIG. 16 is a schematic view of a storage medium that provides information to a computer.
Figure 17:
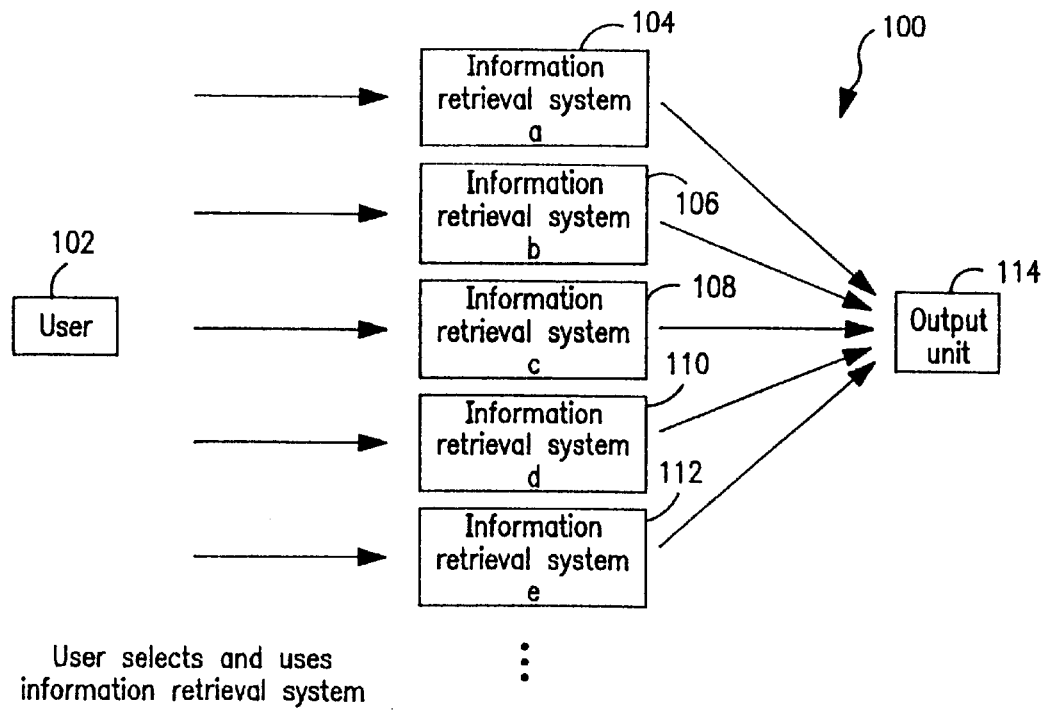
FIG. 17 is a block diagram of a conventional information retrieval system.
Figure 18:
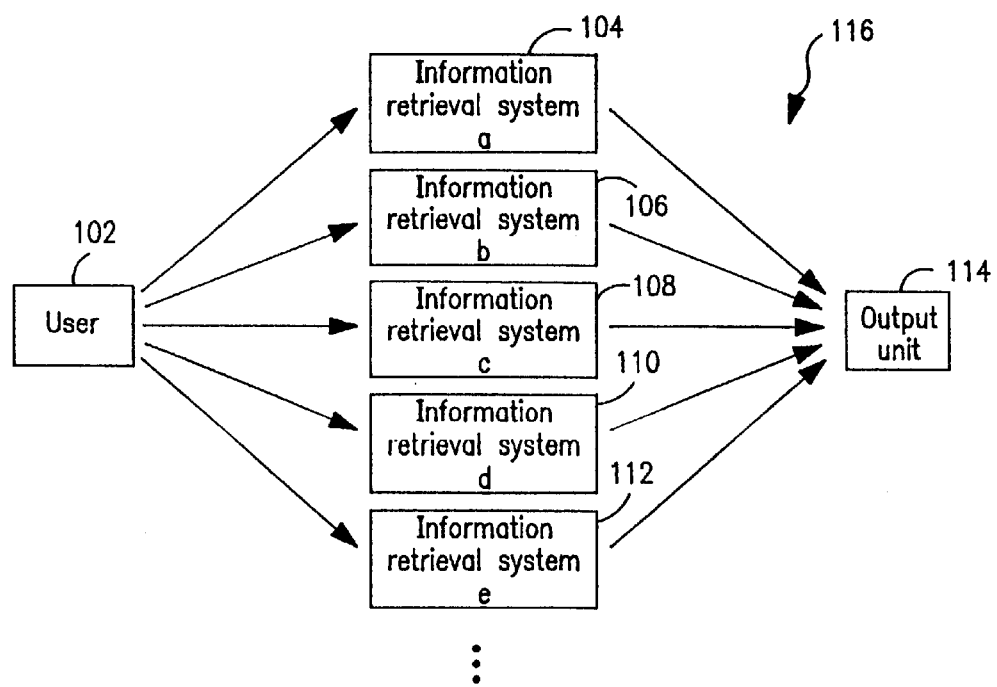
FIG. 18 is a block diagram of a second conventional information retrieval system.

FIG. 16 illustrates a computer readable portable recording medium 179 that can supply programs and data to the information processing unit 170 of FIG. 15. The program and data stored in the portable recording medium 179 and the external database 180 are loaded into the memory 172. The CPU 171 then uses the data and executes that program and carries out the necessary processing.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An information retrieval processing system, comprising:
    a search question input unit to receive a search question of a user;
    a context acquisition unit to acquire a context in which the user input the search question upon receiving the search question of the user, the context acquisition unit including a context action correspondence table that stores information related to the context acquired by the context acquisition unit along with corresponding actions for selecting an information retrieval system; and
    a selection unit to select an information retrieval system from among a plurality of information retrieval systems based on the context acquired by said context acquisition unit, and to access the selected information retrieval unit.

2. The information retrieval processing system according to claim 1, further comprising:
    a history recording unit to record a history of the questions received by said search question input interface unit,
    wherein the recorded history is used during subsequent search question input.

3. An information retrieval processing system, comprising:
    a search question input interface unit to receive a search question from a user;
    a context acquisition unit to acquire a context in which the user input the search question upon receiving the search question from the user, the context acquisition unit including a context action correspondence table that stores information related to the context acquired by the context acquisition unit along with corresponding actions for selecting an information retrieval system; and
    a search question change unit to change the received search question into a second search question based on the context acquired.

4. The information retrieval processing system according to claim 3, wherein said search question change unit accesses an information retrieval unit in accordance with the second search question.

5. An information retrieval processing system, comprising:
    a search question input unit to receive a search question from a user;
    a context acquisition unit to acquire a context in which the user input the search question corresponding to the search question received by said search question input unit, said context acquisition unit including a context action correspondence table that stores information related to the context acquired by said context acquisition unit along with corresponding actions for selecting an information retrieval system; and
    a selection unit to select an information retrieval system from among a plurality of information retrieval systems based on the context acquired by said context acquisition unit, and to access the selected information retrieval unit.

6. The information retrieval processing system according to claim 5, wherein the context action correspondence table records pairs of contexts and corresponding actions, said pairs including a cursor position corresponding to a computer mouse position, a cursor position showing a point of input, or an operation mode of a computer application.

7. The information retrieval processing system according to claim 5, wherein the context provides information indicating a mode of a computer application and a domain indicated by the computer application.

8. The information retrieval processing system according to claim 5, wherein the actions that correspond to the context include activation and access of an information retrieval system among a plurality of information retrieval systems.

9. The information retrieval processing system according to claim 5, further comprising:
a search question history management unit to record search questions received by said search question input interface unit, wherein said search question history management unit accesses past search questions in response to the received search question.

10. The information retrieval processing system according to claim 9, wherein said search question history management unit records the search questions as files in a computer memory such that when a search question is received by said search question input unit, said search question history management unit provides information to said selection unit to select the information retrieval system.

11. The information retrieval processing system according to claim 10, wherein the actions that correspond to the context include activation and access of the selected information retrieval system among a plurality of information retrieval systems.

12. The information retrieval processing system according to claim 9, wherein the actions that correspond to the context include activation and access of the selected information retrieval system among a plurality of information retrieval systems.

13. The information retrieval processing system according to claim 12, wherein the context provides information indicating a mode of a computer application and a domain indicated by the computer application.

14. The information retrieval processing system according to claim 9, wherein the context provides information indicating a mode of a computer application and a domain indicated by the computer application.

15. A program storage medium to store a program which commands a computer to execute a search question input process, said input process comprising:
receiving a search question input by a user;
acquiring a context in which the user input the search question corresponding to the search question upon input by the user;
storing information related to the context acquired along with corresponding actions for selecting the information retrieval system in a context action correspondence table;
selecting an information retrieval system among multiple information retrieval systems based on the context acquired; and
accessing the selected information retrieval system.

16. A program storage medium to store a program which commands a computer to execute a search question input process, said input process comprising:
receiving a search question input by a user;
acquiring a context in which the user input the search question corresponding to the search question upon input of the search question by the user;
storing information related to the context acquired along with corresponding actions for selecting the information retrieval system in a context action correspondence table;
changing the inputted search question into a second search question based on the context acquired; and
accessing an information retrieval system in accordance with the second search question.

17. An information retrieval processing method, comprising:
inputting a search question from a user;
acquiring a context in which the user input the search question corresponding to the search question upon input by the user;
storing information related to the context acquired along with corresponding actions for selecting the information retrieval system in a context action correspondence table;
selecting an information retrieval system among multiple information retrieval systems based on the context acquired; and
accessing the selected information retrieval system.

18. An information retrieval processing method, comprising:
receiving a search question from a user;
acquiring a context in which the user input the search question corresponding to the search question upon input by the user;
storing information related to the context acquired along with corresponding actions for selecting the information retrieval system in a context action correspondence table;
changing the received search question into a second search question based on the context acquired; and
accessing an information retrieval system in accordance with the second search question.

19. The information retrieval processing method according to claim 18, further comprising:
changing the second search question into a third search question based on the context acquired; and
accessing the information retrieval system in accordance with the third search question.

20. The information retrieval processing method according to claim 18, further comprising:
recording the questions received and comparing subsequently input questions with the recorded questions.

* * * * *